April 15, 1930. L. A. STENGEL 1,754,371
SYNTHETIC METHANOL PROCESS
Filed Nov. 17, 1926
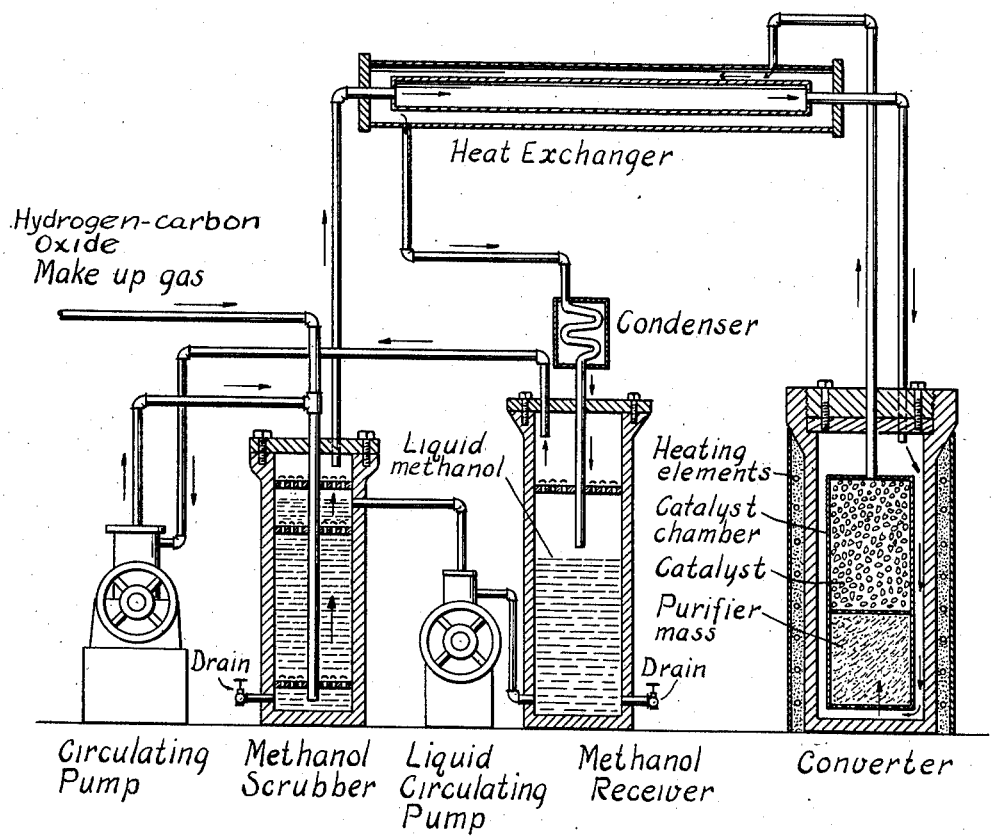
Leonard A. Stengel
Inventor
By
Bruce K. Brown  atty Patented Apr. 15, 1930

1,754,371

UNITED STATES PATENT OFFICE

LEONARD A. STENGEL, OF TERRE HAUTE, INDIANA, ASSIGNOR TO COMMERCIAL SOLVENTS CORPORATION, OF TERRE HAUTE, INDIANA, A CORPORATION OF MARYLAND

SYNTHETIC-METHANOL PROCESS

Application filed November 17, 1926. Serial No. 148,823.

My invention relates to the catalytic synthesis of methanol by the interaction of hydrogen and carbon oxides at elevated temperatures and pressures. More particularly, my invention provides a process for methanol production whereby the gases to be reacted are maintained in a pure form.

It is now well known that when mixtures of hydrogen and carbon oxides (carbon monoxide, carbon dioxide, or mixtures thereof), the hydrogen preferably being present in volumetric excess over the carbon oxides, are passed over heated catalytic agents at pressures in excess of 50 atmospheres and at temperatures in excess 280° C., the gases react to form methanol. When the carbon oxide employed is pure carbon monoxide, the reaction proceeds in accordance with the following simple equation:—

$$CO + 2H_2 \rightleftharpoons CH_3OH$$

When carbon dioxide is employed the reaction presumably occurs in two steps, thus:—

$$CO_2 + H_2 \rightleftharpoons CO + H_2O$$
$$CO + 2H_2 \rightleftharpoons CH_3OH$$

While various inert gases such as methane and nitrogen are ordinarily regarded as noninjurious, and hence tolerable by the reaction, it is well known that very small amounts of certain other substances are poisonous to the catalysts employed, or may catalyze various undesirable side reactions.

Such impurities may originate in at least three ways:—They may be present in the gaseous mixture entering the reaction; they may be formed by the reaction; or they may be formed by the gradual decomposition of the apparatus employed.

Among these undesirable impurities are included the following:—volatile carbonyls of nickel and iron which may be formed by the interaction of the hot carbon oxides with the apparatus; oil vapors from the compressing apparatus; water vapor remaining in the recirculated gas after the condensation of the methanol formed; amino compounds which may be initially present in the gases, or may be formed by the catalytic interaction of hydrogen with traces of nitrogen present in the gaseous mixture; and volatile sulfur and arsenic compounds.

Even if a gas mixture of extremely high purity is initially supplied to the process, impurities are built up in the manner described, during the recirculation of the gases through the apparatus.

I have now discovered that the injurious substances present or formed in the gas mixture employed for the methanol synthesis may be removed in a simple fashion by merely "scrubbing" the gases with liquid methanol. This method of purification is extremely advantageous since it does not require the use of extra chemicals or of heat, and since it may be operated under the same pressure used for the methanol reaction, as a simple added step of the process.

I have discovered that when the gas mixtures employed in the methanol synthesis are simply bubbled through or "scrubbed" with liquid methanol under elevated pressure, the undesirable substances constituting catalyst poisons, etc., are dissolved in the methanol. The methanol may, of course, be removed from the process by gradual draining, without in any way interfering with the main operation or diminishing the reaction pressure.

A further advantage of such a method of purification lies in the fact that, since only the end-product of the reaction—i. e. methanol—is employed in the process, there is no possibility of contaminating the gas mixture with foreign substances. It should further be noted that since the amount of impurities initially present in the gas mixture or formed during the reaction is indeed small, the use of some of the methanol formed in the process as the purification medium does not render it "impure" under ordinary industrial standards and it may therefore be marketed without any treatment to remove the dissolved impurities.

As illustrative of one convenient method of performing the process of my invention, disclosed above, Fig. 1 of the drawing is displayed. The drawing discloses in cross-section a typical apparatus for the production of synthetic methanol, together with means for performing my purification process.

As shown in the drawing the make-up gas. which consists of the mixture of hydrogen and carbon oxides supplied to the process, enters under elevated pressure through a pipe passing downward through the methanol scrubber. Just prior to its entrance into the methanol scrubber the fresh or make-up gas is combined with residual gas which has already been circulated over the catalyst, said residual gas being forced into the main gas flow by means of the circulating pump. The combined gases pass through a pipe downward to the bottom of the scrubber and then rise upward through the liquid methanol shown therein. In the specific structure shown in the drawing, the gas is broken up into small streams of bubbles by means of the boiling plates and caps shown in the scrubber. During its passage through the scrubber the gas is freed from impurities. The gas collecting in the top of the scrubber passes to the heat exchanger as shown in the drawing.

In passing through the central passage of the heat exchanger the gas is heated, by thermal contact through the exchanger wall, with the hot gases discharged from the converter. From the heat exchanger the gases pass downward to the converter, first moving through the annular space between the converter wall and the catalyst chamber wall, then upward through a purifier mass and finally in contact with the catalyst, where the reaction occurs.

The required degree of heat in the converter and catalyst is maintained, partly by the heat of reaction, and partly by the electrical heating elements shown in the drawing.

From the catalyst chamber the hot, methanol-containing gases rise upward and pass through the outside section of the heat exchanger where most of the heat is removed. The gases then pass downward through a condenser which serves to liquefy the contained methanol, and the liquid separates from the residual gas and remains in the receiver. The receiver may be fitted with a boiling plate with caps, as shown, to prevent liquid entrainment. The residual gas passes upward out of the receiver and back to the circulating pump, thus completing the circuit.

The liquid circulating pump, shown on the drawing as interposed between the methanol receiver and the methanol scrubber, is employed to transfer liquid methanol from the former to the latter. This pump, or a similar device, is required to accomplish the transfer on account of a slight difference in pressure between the different parts of the closed system. This pressure difference, which is caused by the resistance to gas flow occasioned by friction in the pipe lines and particularly the resistance to flow which is presented by the catalyst, is overcome by the circulating pump.

In the operation of the process in accordance with the drawing, the liquid circulating pump may be operated either intermittently or continuously. In the case of intermittent operation, the methanol scrubber is filled with methanol and the supply pump is stopped. The methanol formed in the process collects in the methanol receiver and is continuously removed by the drain shown. Periodically, the methanol in the scrubber is removed and a fresh supply added.

In the case of the continuous operation of the liquid circulating pump, the drain line on the methanol receiver is kept shut and the liquid circulating pump is operated at a speed proportionate to the rate of deposition of methanol in the receiver. In this manner all of the methanol produced passes through the liquid circulating pump and the methanol scrubber, leaving the process through the drain in the bottom of the scrubber.

If the latter system of operation is employed, a slight variation in the method of scrubbing the gases is advantageous. Instead of maintaining the level of methanol in the scrubber at the high point indicated in the drawing, it may better be reduced to a lower level—about that of the lowest boiling plate shown. The scrubber may then be filled with Raschig rings or similar tower packing material, and the liquid methanol supplied to the top of the scrubber by the liquid circulating pump may be sprayed down over the packing, contacting with the gases in the form of a mist or of fine streams, rather than in the ordinary liquid phase.

My process is in no way dependent on the use of a specific catalyst. In general, any catalyst suitable for synthetic methanol production may be employed in the process, these catalysts ordinarily consisting of mixtures of metallic oxides such as are described, for example, in United States Patents 1,558,559 and 1,608,643, and in English Patents 229,714, and 229,715.

The purifier mass shown in the drawing and mentioned in the specification may consist of copper turnings or asbestos fiber, or, indeed, of some of the catalyst employed in the reaction. Its function is to act as a sort of gas filter and to decompose any traces of metallic carbonyls which might otherwise come in contact with the catalyst.

When my invention is employed in the synthesis of methanol, the use of a purifier mass is no longer absolutely necessary. If not employed, the section of the converter shown as containing it may either be left empty or may be filled with catalyst. However in the preferred embodiment of my invention I choose to employ the purifier mass as an additional safeguard to the purity of the reacting gases at the time they come in contact with the catalyst.

My invention is capable of being practiced in many types of apparatus, and it is obvious that manipulative variations may be introduced without departing from the spirit thereof.

For example, while I have shown the use of the liquid methanol formed in the process as the purifying medium for the incoming gases, it is obvious that the purification of the gases might be accomplished by contacting them with liquid methanol in a scrubbing system entirely separate from the catalytic process.

Now having fully described my invention, I claim the following as new and novel:—

1. In the process of manufacturing methanol by the interaction of hydrogen and carbon oxides containing traces of impurities, in the presence of a catalyst and under the influence of elevated pressure and temperature, the step of removing said impurities from the gases by scrubbing them with liquid methanol.

2. In the process of manufacturing methanol by the interaction of hydrogen and carbon oxides in the presence of a catalyst and under the influence of elevated temperature and pressure, the step of combining the gases remaining unreacted, after a passage thereof in contact with the catalyst, with fresh gas, and removing impurities from the mixed gases by scrubbing them with liquid methanol.

3. In the process of manufacturing methanol by the interaction of hydrogen and carbon oxides containing traces of impurities in the presence of a catalyst and under the influence of elevated pressure and temperature, the steps of removing said impurities by scrubbing said incoming gases with the formed methanol during its removal from the process.

4. In a process for the production of synthetic methanol by the interaction of hydrogen and carbon oxides at elevated pressure the steps which comprise passing the gases in contact with liquid methanol under pressure, heating the gases by thermal contact with the hot gases from the reaction, contacting the gases with a heated catalyst to produce methanol, cooling the reacted gases and removing the formed methanol therefrom, combining the residual gas with fresh gas, and repeating the cycle.

In testimony whereof I affix my signature.

LEONARD A. STENGEL.